(12) United States Patent
Hara et al.

(10) Patent No.: US 7,475,704 B2
(45) Date of Patent: Jan. 13, 2009

(54) VALVE DRIVE DEVICE

(75) Inventors: Tetsuhiko Hara, Nagano (JP); Shigeru Ozawa, Nagano (JP)

(73) Assignee: NIDEC Sankyo Corporation, Nagano (JP)

( * ) Notice: Subject to any disclaimer, the term of this patent is extended or adjusted under 35 U.S.C. 154(b) by 573 days.

(21) Appl. No.: 11/234,426

(22) Filed: Sep. 22, 2005

(65) Prior Publication Data
US 2006/0060807 A1    Mar. 23, 2006

(30) Foreign Application Priority Data
Sep. 22, 2004 (JP) .............................. 2004-274355

(51) Int. Cl.
F16K 11/074 (2006.01)
F16K 3/30 (2006.01)
F16K 31/53 (2006.01)

(52) U.S. Cl. .................... 137/625.11; 251/248; 251/359

(58) Field of Classification Search ............ 137/625.11, 137/625.15, 625.46; 251/248, 359
See application file for complete search history.

(56) References Cited

U.S. PATENT DOCUMENTS 1,949,613 A * 3/1934 McDonald ............... 123/188.8
6,865,900 B2 * 3/2005 Ozawa et al. ............... 62/199
2004/0025534 A1 * 2/2004 Ozawa et al. ............... 62/504
2004/0119040 A1 * 6/2004 Hara et al. .................. 251/304

* cited by examiner

*Primary Examiner*—John Rivell
(74) *Attorney, Agent, or Firm*—Reed Smith LLP

(57) ABSTRACT

A valve drive device includes a valve seat plate in which an inflow port and an outflow port for fluid are formed, a sealing case covering the front face side of the valve seat plate, an inflow pipe and an outflow pipe which are fixed in the rear face side of the valve seat plate so as to be in communication with the inflow port and the outflow port, and a valve element which slides on an area where the outflow port is formed on the front face side of the valve seat plate to open or close the outflow port. The valve seat plate includes a first plate member which constructs an area where the outflow port is formed, a second plate member which is thinner than the first plate member and is jointed with the first plate member, and a deformation preventing member which is attached on the rear face of the second plate member and prevents the second plate member from being deformed due to an internal-pressure in a sealed space constructed by the sealing case and the valve seat plate.

9 Claims, 5 Drawing Sheets

[Fig. 1]
(A)
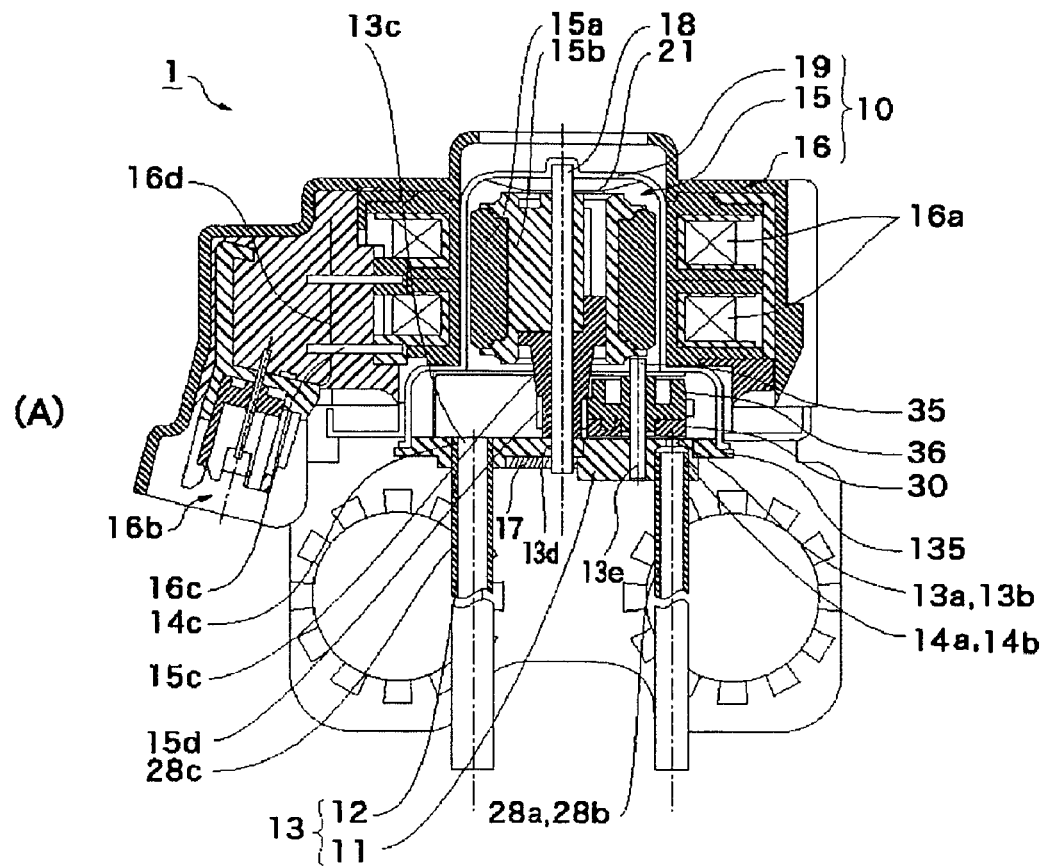
(B)
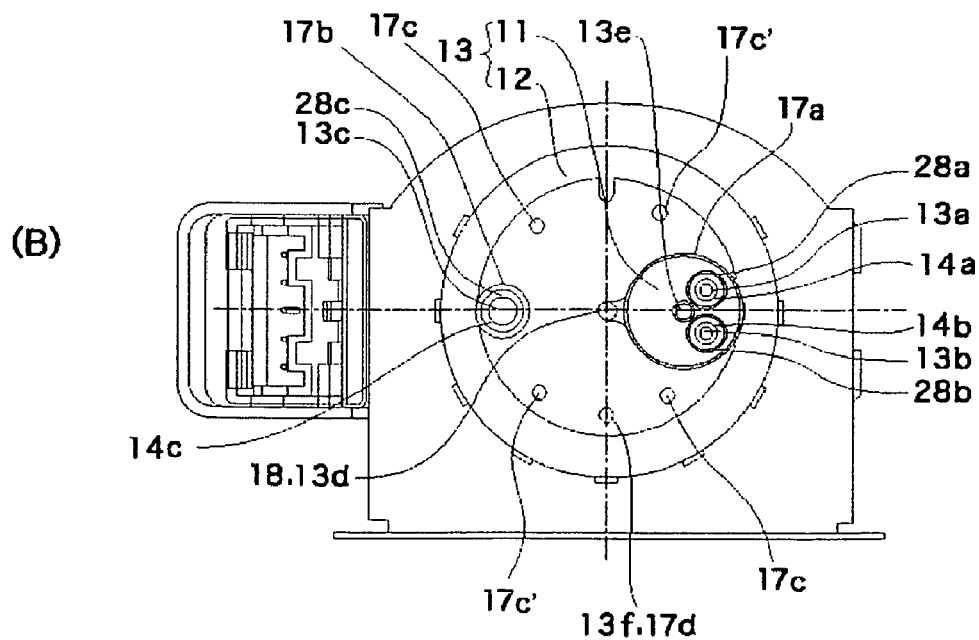

[Fig. 2]
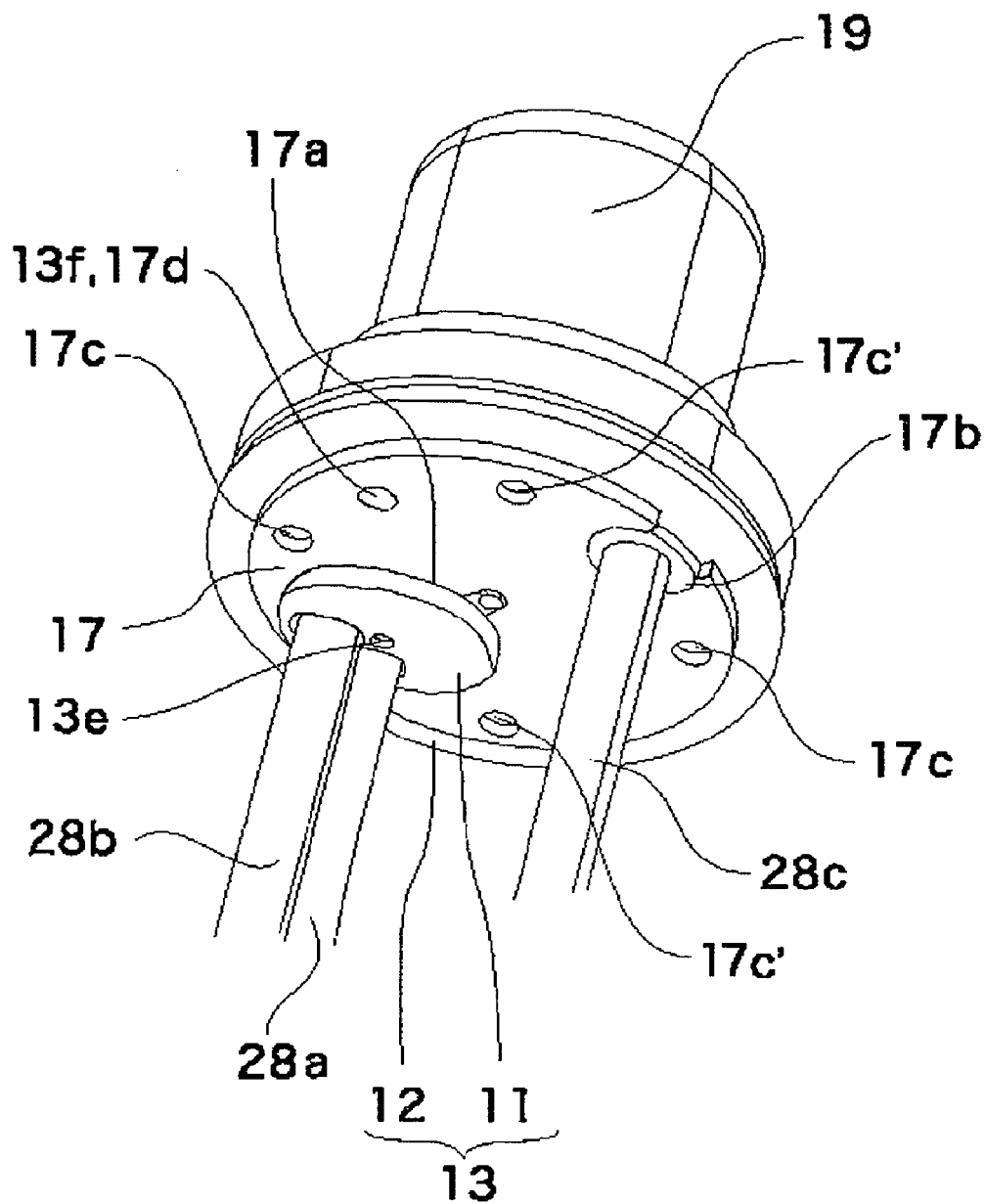

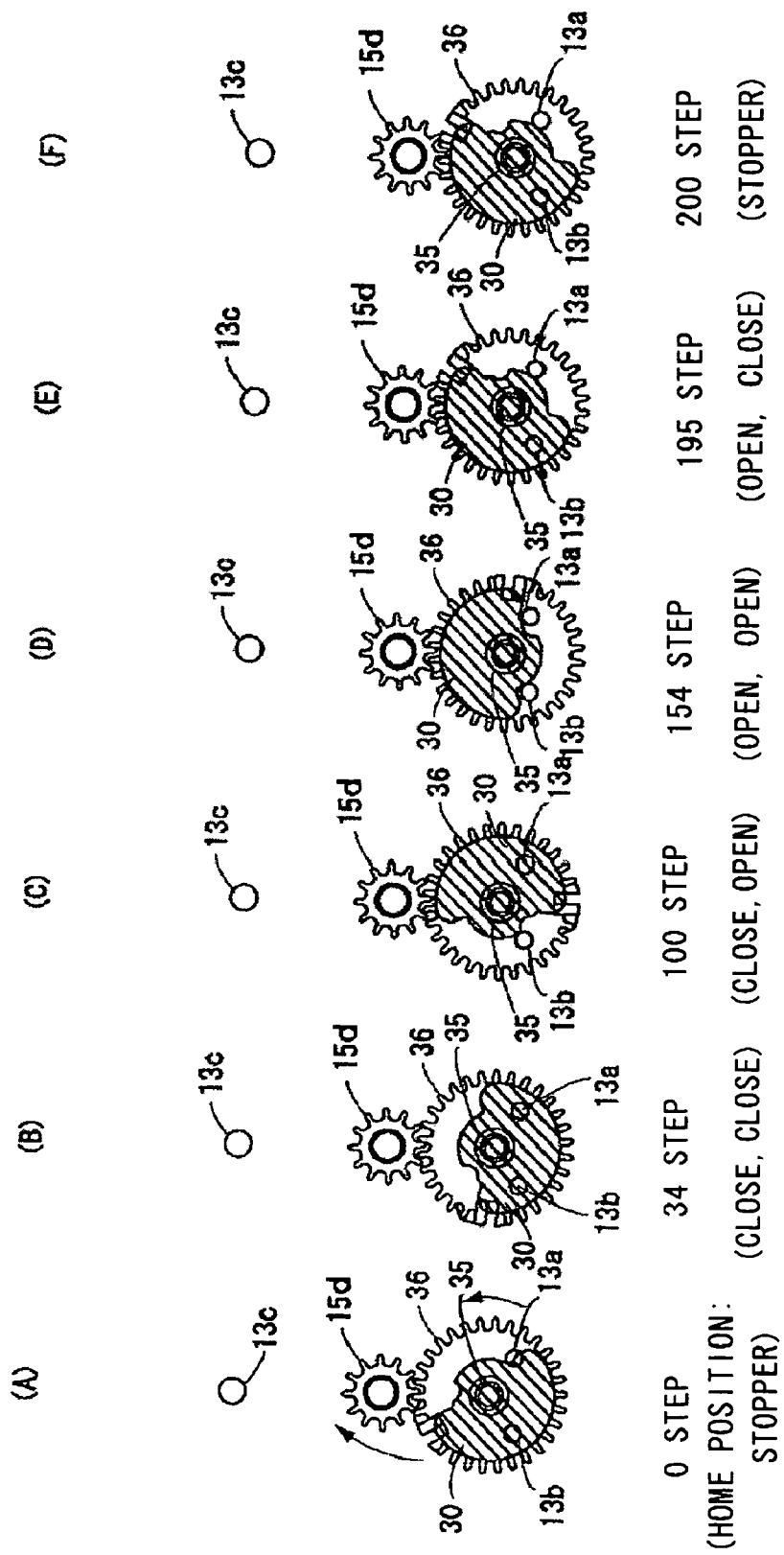
[Fig. 3]

[Fig. 4]
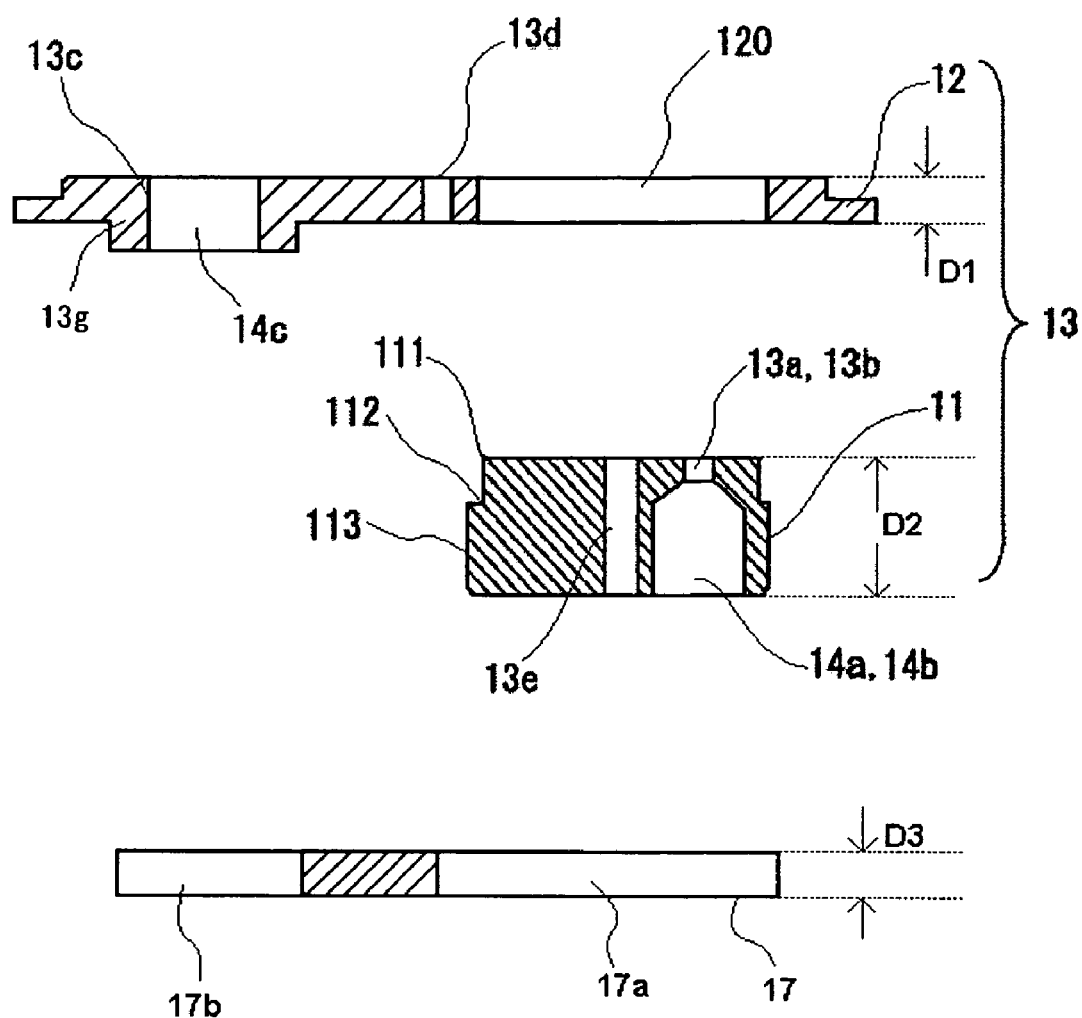

[Fig. 5]
(Prior Art)
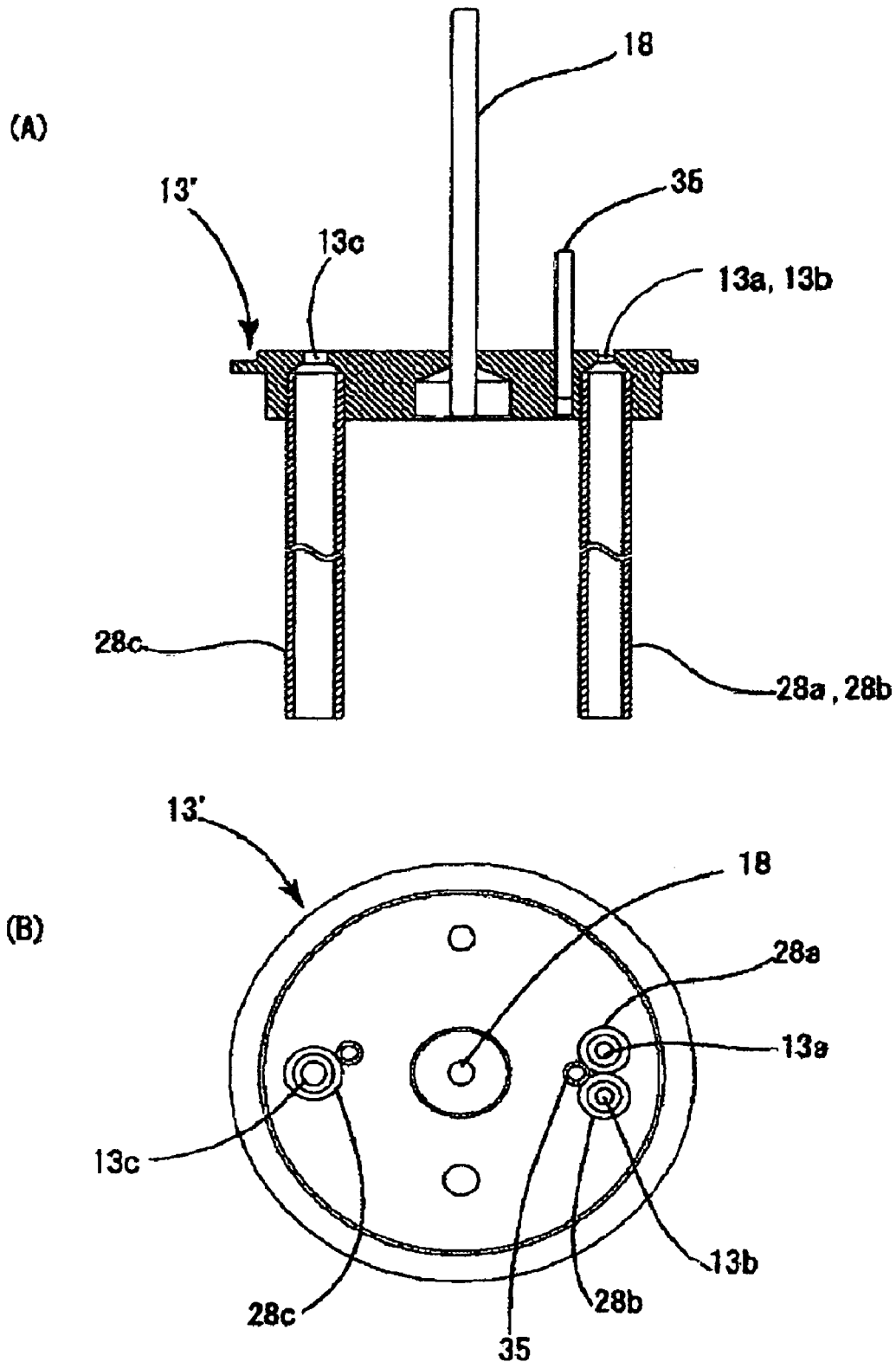

VALVE DRIVE DEVICE

CROSS-REFERENCE TO RELATED APPLICATIONS

This application claims priority to Japanese Application No. 2004-274355 filed Sep. 22, 2004, which is incorporated herein by reference.

FIELD OF THE INVENTION

The present invention relates to a valve drive device for opening and closing a plurality of aperture parts by using a valve element to distribute fluid. More specifically, the present invention relates to a structure of a valve seat plate that is used in the valve drive device.

BACKGROUND OF THE INVENTION

A refrigerator is provided with a valve drive device which distributes a common refrigerant (fluid) to a plurality of compartments for cooling the respective compartments. The valve drive device includes a valve seat plate $13'$ through which an inflow port $13c$ and outflow ports $13a$, $13b$ for the refrigerant penetrate in its thickness direction, a sealing case (not shown) which covers the front face side of the valve seat plate $13'$, and a valve element (not shown) which slides on the front face of the valve seat plate $13'$ to open or close the outflow ports $13a$, $13b$ as shown in FIGS. 5(A) and 5(B). Further, a rotor support shaft 18 and a valve element support shaft 35 are fixed in the valve seat plate 13.

The inflow port $13c$ and the outflow ports $13a$, $13b$ in the valve seat plate $13'$ are formed in a stepped hole whose front face side is formed with a small diameter and whose rear face side is formed with a large diameter. The large diameter portion on the rear face side of the inflow port $13c$ and the outflow ports $13a$, $13b$ is used as a pipe insert hole and the inflow pipe $28c$ and the outflow pipes $28a$, $28b$ are brazed to the pipe insert holes in the state where their tip ends are respectively abut with the stepped portions of the stepped holes.

In the valve drive device constructed as described above, the area of the surface of the valve seat plate $13'$ where the outflow ports $13a$, $13b$ are formed becomes a sliding face for the valve element and thus a high degree of surface accuracy is required to completely cut off the refrigerant. Also, it is required for the valve seat plate $13'$ to be sufficiently thick such that distortion does not occur in the sliding face for the valve element even when the valve seat plate $13'$ is heated to a temperature caused by brazing, for example, the temperature of 1000° C. or more at the time when the pipes $28a$, $28b$, $28c$ are fixed by brazing. In addition, the valve seat plate $13'$ is made of iron system material so as to be capable of being brazed and a SUS material is used because of its corrosion resistance.

Therefore, in the case that the valve seat plate $13'$ is conventionally produced, cutting work (lathe work) is required to perform on a thick SUS member and thus the valve seat plate $13'$ becomes expensive.

It is conceivable that the valve seat plate is produced by using a method of forging instead of cutting work, but forging also causes the valve seat plate to be expensive. In addition, a high degree of dimensional accuracy and positional accuracy of hole is difficult to obtain by forging. Also, residual stress becomes large in the case of forging and thus, when brazing is performed, a face where a high degree of accuracy is required is distorted by heat due to the brazing.

Further, it is also conceivable that the valve seat plate is produced by using a method of sintering and molding instead of cutting work, but sintering and molding also causes the valve seat plate to be expensive although it is not more than cutting work. Moreover, sealing treatment is required to a sintered body but, in the case of resin impregnation which is a general sealing treatment, resin cannot endure a high temperature at the time of brazing. In addition, since the surface hardness of a sintered body is low, tolerance to sliding of a valve element is low. Further, since the smallest dimension of the diameter of a hole which can be formed by sintering is limited, a cutting work is required as a secondary working to form a hole, for example, with the diameter of 1.50.

SUMMARY OF THE INVENTION

In view of the problems described above, it is an object and advantage of the present invention to provide a valve drive device in which a pipe can be mounted without occurring distortion on a portion where the valve element slides and manufacturing cost of a valve seat plate can be reduced.

In order to achieve the above object and advantage, according to an embodiment of the present invention, there is provided a valve drive device including a valve seat plate in which an inflow port and an outflow port for fluid are formed so as to penetrate through the valve seat plate in its thickness direction, a sealing case which covers the front face side of the valve seat plate, an inflow pipe and an outflow pipe which are fixed in the rear face side of the valve seat plate so as to be in communication with the inflow port and the outflow port, and a valve element which slides on an area where the outflow port is formed on the front face side of the valve seat plate to open or close the outflow port. The valve seat plate includes a first plate member which constructs an area where the outflow port is formed, a second plate member which is thinner than the first plate member and is joined with the first plate member, and a deformation preventing member which is attached on the rear face side of the second plate member and prevents deformation of the second plate member due to an internal-pressure in a sealed space constructed by the sealing case and the valve seat plate. The second plate member is joined with the first plate member and fitted to the sealing case to construct a sealing space in the inside of the sealing case together with the first plate member.

In an embodiment of the present invention, the valve seat plate is divided into the first plate member and the second plate member in an intra-surface direction and the respective plate members are constructed so as to have an characteristic required to the respective plate members. For example, the second plate member is a pressed product and the first plate member is a cutting-work product that is thicker than the second plate member. The first plate member is fitted to a through hole formed in the second plate member. The area of the surface of the first plate member where the outflow port is formed is the sliding face for the valve element. In accordance with an embodiment of the present invention, the first plate member made of a cutting-work product is used for this portion where the outflow port is formed and thus this portion can be formed in a high degree of surface accuracy.

Further, since the first plate member is a cutting-work product, the first plate member is constructed in a thickness which is capable of enduring the temperature at the time when the outflow pipe is fixed by brazing and thus distortion does not occur in the sliding face for the valve element. Although working cost of a cutting-work product is high, in an embodiment of the present invention, the cutting-work product is used only for the first plate member and thus the area required to perform a cutting work is small. As a result, increase of manufacturing cost can be restrained.

A thin pressed product is used for the second plate member. Therefore, when internal-pressure in a sealed space formed by the valve seat plate and the sealing case increases, the second plate member may deform to cause a joined portion between the first plate member and the second plate member to occur a crack and thus airtightness of the sealed space may be impaired. However, in accordance with an embodiment of the present invention, since deformation of the second plate member is prevented by the third plate member, the crack of jointed portions between the first plate member and the second plate member can be prevented. Alternatively, it is conceivable that a rib for reinforcement is protruded from the second plate member when the second plate member is produced by press working. However, in this case, holes for mounting the first plate member and a pipe are difficult to be formed with a required accuracy.

In addition, although the second plate member is unable to be finished with a high degree of surface accuracy, the sliding face for the valve element is not formed in the second plate member and thus a high degree of surface accuracy is not required in the second plate member. In other words, according to an embodiment of the present invention, since a thick cutting-work product is used only in a required portion, a pipe can be attached without occurring distortion on the portion where the valve element slides and manufacturing cost of the valve seat plate can be reduced. In accordance with an embodiment of the present invention, it is preferable that a rotor support shaft, which rotatably supports a pinion member that is rotated by a motor, is fixed in the second plate member by brazing, and a valve element support shaft, which rotatably supports a gear that is rotated by the pinion member and is formed with the valve element for opening or closing the outflow port in an integral manner, is fixed in the first plate member by brazing.

In accordance with an embodiment of the present invention, it is preferable that the deformation preventing member is a third plate member made of a planar thin plate which is formed in a size to cover an approximately entire face of the second plate member and an outer side of the third plate member is fixed on the rear face of the second plate member. According to the construction described above, since the outer side of the second plate member is fixed to the third plate member, deformation of the second plate member can be effectively prevented in comparison with the case that the inner peripheral side of the second plate member is fixed to the third plate member.

In accordance with an embodiment of the present invention, it is preferable that the third plate member is provided with four fixing parts which are fixed on the rear face of the second plate member and the fixing parts are disposed such that straight lines connecting two opposite fixing parts each other are roughly perpendicular to each other. According to the construction described above, deformations of the second plate member in two directions perpendicular to each other in an intra-surface direction are prevented in a good balance, and thus the occurrence of a crack at the fixed portions between the second plate member and the third plate member can be prevented.

In accordance with an embodiment of the present invention, it is preferable that the fixing part is constructed by a brazed portion which is formed such that a portion around a through-hole formed in the third plate member is brazed. According to the construction described above, brazing material can be surely supplied to the fixing part through a through-hole from the rear face side of the third plate member.

As described above, in accordance with an embodiment of the present invention, the valve seat plate is divided into the first plate member and the second plate member in an intra-surface direction and the respective plate members are constructed so as to have an characteristic required to the respective plate members. Therefore, increase of manufacturing cost can be restrained. Further, although the area of the surface of the valve seat plate where the outflow port is formed is the sliding face for the valve element, the first plate member made of a cutting-work product is used for this portion where the outflow port is formed and thus the first plate member is constructed in a thickness which is capable of enduring the temperature when the outflow pipe is fixed by brazing and distortion does not occur in the sliding face for the valve element. On the other hand, the sliding face for the valve element is not formed in the second plate member and thus a high degree of surface accuracy is not required in the second plate member. Therefore, the second plate member can be made thinner than the first plate member and thus an inexpensive pressed product can be used. In the case that the thickness of the second plate member is made smaller, when internal-pressure in a sealed space formed by the valve seat plate and the sealing case increases, the second plate member may deform to cause a fixed portion between the first plate member and the second plate member to occur a crack and thus airtightness of the sealed space may be impaired. However, in accordance with an embodiment of the present invention, since deformation of the second plate member is prevented by the deformation preventing member, the crack of jointed portions between the first plate member and the second plate member can be prevented.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

FIG. 1(A) is a longitudinal cross-sectional view showing a valve drive device in accordance with an embodiment of the present invention and FIG. 1(B) is its bottom view.

FIG. 2 is a perspective view showing a state where a sealing case is attached on the front face side of a valve seat plate which is viewed from obliquely lower side.

FIGS. 3(A) through 3(F) are respectively explanatory views showing respective modes in the valve drive device shown in FIGS. 1(A) and 1(B).

FIG. 4 is an exploded longitudinal cross-sectional view showing the valve seat plate and a third plate member shown in FIGS. 1(A) and 1(B) and FIG. 2.

FIG. 5(A) is a longitudinal cross-sectional view showing the valve seat plate of a conventional valve drive device and FIG. 5(B) is its bottom view.

DETAILED DESCRIPTION OF THE PREFERRED EMBODIMENTS

A valve drive device for a refrigerator in accordance with an embodiment of the present invention will be described below with reference to the accompanying drawings.

FIG. 1(A) is a longitudinal cross-sectional view showing a valve drive device in accordance with an embodiment of the present invention and FIG. 1(B) is its bottom view. FIG. 2 is a perspective view showing a state where a sealing case is attached on the front face side of a valve seat plate that is viewed from obliquely lower side. FIGS. 3(A) through 3(F) are respectively explanatory views showing respective modes in the valve drive device shown in FIGS. 1(A) and 1(B).

In FIGS. 1(A) and 1(B), a valve drive device 1 in accordance with an embodiment of the present invention includes a valve seat plate 13 and a sealing case 19 which covers the front face side of the valve seat plate 13.

In the valve drive device 1, a stepping motor 10 as a valve driving device for driving the valve element 30 is constructed by utilizing the inside and the outside of the sealing case 19. In the stepping motor 10, a rotor 15 is disposed on the inner side of the sealing case 19 and a stator 16 is disposed on the outer peripheral side of the sealing case 19. Wire terminals drawn out from fixed coils 16a of the stator 16 are respectively wound around terminal pins 16c and the terminal pins 16c and a connector 16b are connected each other by a flexible printed circuit board (FPC) 16d. Drive signals are outputted to the connector 16b from a control section (not shown in the drawing) having a microcomputer to control the rotation and stoppage of the rotor 15.

The rotor 15 includes a magnet holding member 15b on which a magnet 15a is held on its outer peripheral side and a pinion member 15d which is connected to the magnet holding member 15b in an integrally rotatable manner. A pinion 15d is formed at the end part of the pinion member 15c on the valve seat plate 13 side and the pinion member 15c is rotatably supported by the rotor support shaft 18 (rotational center shaft).

The lower side of the sealing case 19 is formed to be an enlarged portion having a larger diameter to construct a step portion on which the stator 16 is mounted. The lowest end portion of the sealing case 19 is tightly fitted by TIG welding with a step portion 135 that is formed in the outer peripheral edge part of the valve seat plate 13.

As shown in FIGS. 1(A) and 1(B), an inflow port 13c and two outflow ports 13a, 13b are formed to be opened in the valve seat plate 13. The inflow port 13c is in communication with an inflow pipe 28c which is inserted into the valve seat plate 13 and the two outflow ports 13a, 13b are respectively in communication with outflow pipes 28a, 28b which are inserted into the valve seat plate 13. Therefore, the refrigerant which is introduced into the sealing case 19 through the inflow port 13c flows out from the outflow ports 13a, 13b.

Pipe insert hole 14a, 14b, 14c are formed on the rear face side of the outflow ports 13a, 13b and the inflow port 13c in the valve seat plate 13. The pipe insert holes 14a, 14b are formed larger in diameter than the outflow ports 13a, 13b to be a stepped hole and the pipe insert hole 14c is formed in a parallel hole.

The inflow pipe 28c through which the refrigerant is supplied is inserted and brazed into the pipe insert hole 14c from the rear face side and thus the inflow pipe 28c is in communication with the inflow port 13c. Further, the first outflow pipe 28a and the second outflow pipe 28b for supplying the refrigerant in respective compartments of a refrigerator are inserted and brazed into the pipe insert holes 14a, 14b from the rear face side and thus the first outflow pipe 28a and the second outflow pipe 28b are in communication with the first outflow port 13a and the second outflow port 13b.

Shaft holes 13d, 13e are formed as a straight hole at a near place of the outflow ports 13a, 13b in the valve seat plate 13. The base ends of a rotor support shaft 18 and a valve element support shaft 35 are respectively fixed by brazing to the shaft holes 13d, 13e.

The brazing material used to fix the rotor support shaft 18 and the valve element support shaft 35 ensures airtightness in the shaft holes 13d, 13e.

In FIGS. 1(A) and 1(B), the valve element support shaft 35 supports a valve element 30 which is integral with the gear 36. In an embodiment of the present invention, the valve element 30 is used as a common valve element which slides on the surface of the valve seat plate 13 over the area where the first outflow port 13a and the second outflow port 13b are formed to respectively open or close the outflow ports 13a, 13b.

The gear 36 engages with a pinion 15d and is rotatably driven about the valve element support shaft 35 by the stepping motor 10. Therefore, the valve element 30 is also rotatably driven by the stepping motor 10.

In an embodiment of the present invention, the valve seat plate 13 comprises a first disk-shaped plate member 11 which is constructed in an area where the outflow ports 13a, 13b are formed and a second disk-shaped plate member 12 on which the first plate member 11 is mounted. The first plate member 11 is formed in an enough size that the valve element 30 is capable of sliding the entire area to open or close the outflow ports 13a, 13b.

In an embodiment of the present invention, a state where the first outflow port 13a is closed and the second outflow port 13b is closed is set to be a CLOSE-CLOSE mode, a state where the first outflow port 13a is closed and the second outflow port 13b is opened is set to be a CLOSE-OPEN mode, a state where both the first outflow port 13a and the second outflow port 13b are opened is set to be an OPEN-OPEN mode, and a state where the first outflow port 13a is opened and the second outflow port 13b is closed is set to be an OPEN-CLOSE mode. Therefore, when the angular position of the valve element 30 is controlled, the home position shown in FIG. 3(A) (zero step), the CLOSE-CLOSE mode shown in FIG. 3(B) (34 steps), the CLOSE-OPEN mode shown in FIG. 3(C) (100 steps), the OPEN-OPEN mode shown in FIG. 3(D) (154 steps), the OPEN-CLOSE mode shown in FIG. 3(E) (195 steps), and the end position of OPEN-CLOSE state shown in FIG. 3(F) (200 steps) can be obtained in this order.

FIG. 4 is an exploded longitudinal cross-sectional view showing the valve seat plate and a third plate member shown in FIGS. 1(A) and 1(B) and FIG. 2.

In an embodiment of the present invention, the second plate member 12 is formed of a pressed product, for example, a pressed product with the thickness "D1" of 1.6 mm as shown in FIG. 4. The first plate member 11 is formed of a cutting-work product made of SUS material which is thicker than the second plate member 12. The first plate member 11 is formed of, for example, a cutting-work product with the thickness "D2" of 4 mm as shown in FIG. 4.

The second plate member 12 is formed with a through hole 120 into which the first plate member 11 is mounted. Further, a third plate member 17, which is positioned by a positioning protruded part 13f (see FIG. 1(B)) and a cylindrical edge part 13g formed in a cylindrical shape at the end part of the pipe insert hole 14c, is fixed by brazing on the rear face side of the second plate member 12.

The third plate member 17 is provided with a function as a deformation preventing member which prevents the second plate member 12 from protruding outside to be deformed due to increasing of an internal-pressure in the sealing case 19. The third plate member 17 is, for example, a pressed product made of a planar thin plate with the thickness "D3" of 1.0 mm as shown in FIG. 4 and formed in a size so as to be capable of covering a roughly entire face of the second plate member 12 as shown in FIG. 1(B). As shown in FIG. 2, an outer peripheral ring-shaped space where the second plate member 12 is not covered by the third plate member 17 is provided in order to perform TIG welding with the sealing case 19. When the second plate member 12 is fitted to the sealing case 19 by a method other than TIG welding, the third plate member 17 may be formed in a size to completely cover the entire face of the second plate member 12.

Four supply holes 17c, 17c' are formed on the outer peripheral side of the third plate member 17 as a through-hole which is used to supply brazing material on the rear face side of the second plate member to fix with brazing. An engaging hole 17d with which the positioning protruded part 13f engages is also formed on the outer peripheral side of the third plate member 17. Four supply holes 17c, 17c' are formed so that two straight lines which respectively connect two supply holes 17c each other and two supply holes 17c' each other are set to be approximately perpendicular to each other.

A cut-out part 17a to which the first plate member 11 is mounted is formed in the third plate member 17 similarly to the second plate member 12. The cut-out part 17a is formed such that its one side is opened to the outside and the other side is cut out in a size so that the rotor support shaft 18 can be mounted. Further, a cut-out part 17b to which the cylindrical edge part 13g is mounted is formed on the opposite side of the cut-out part 17a with respect to the rotor support shaft 18. The cut-out part 17b is also formed so that its one side is opened to the outside.

On the other hand, the first plate member 11 is formed with a small diameter part 111 which is inserted into the through hole 120 from the rear face side of the second plate member 12, a ring-shaped stepped part 112 which abuts with an opening edge part of the through hole 120 when the small diameter part 111 is inserted into the through hole 120, and a large diameter part 113 which is located on an outer side of the through hole 120 and fits loosely to the through hole 17a of the third plate member 17.

The brazing operation of the valve seat plate 13 with the third plate member 17 is performed in the following steps. In other words, first, the small diameter part 111 is press-fitted to the through hole 120 from the rear face side such that the large diameter part 113 is located on the rear face side of the second plate member 11 and temporarily fitted in the state that the ring-shaped stepped part 112 abuts with the opening edge part of the through hole 120. Next, the through hole 17a is loosely fitted to the large diameter part 113 and the third plate member 17 is temporarily fitted on the rear face side of the second plate member 12 in the state where the cut-out part 17b and the engaging hole 17d respectively abuts with the cylindrical edge part 13g and the positioning protruded part 13f. After that, when brazing is performed on a gap space between the large diameter part 113 and the second plate member 12 and a gap space between the second plate member 12 and the third plate member 17, brazing material is supplied to the gap space between the first plate member 11 and the second plate member 12. Therefore, a high degree of airtightness can be obtained. Further, brazing material is supplied to a gap space between the second plate member 12 and the third plate member 17 from four supply holes 17c, 17c', and thus at least portions around four supply holes 17c, 17c' can be surely unified. In addition, since brazing is performed from the rear face side of the valve seat plate 13, the surface accuracy of the valve seat plate 13 on which the valve element 30 slides may not be lowered due to brazing material.

In an embodiment of the present invention, brazing material is supplied to a gap space between the large diameter part 113 and the second plate member 12 through a gap space between the large diameter part 113 and the through hole 17a. Therefore, brazing material which is supplied from the gap space is supplied to a gap space between the second plate member 12 and the third plate member 17, and thus portions between the plate members 12, 17 around the through hole 17a can be surely unified by brazing material.

In an embodiment of the present invention, brazing operation is performed by using a hydrogen reducing furnace. When the valve seat plate 13 is brazed, the inflow pipe 28c, the outflow pipes 28a, 28b, the rotor support shaft 18 and the valve element support shaft 35 are also simultaneously brazed. In other words, while the inflow pipe 28c is inserted from the rear face side into the pipe insert hole 14c which is in communication with the inflow port 13c and the outflow pipes 28a, 28b are inserted from the rear face side into the pipe insert holes 14a, 14b which are in communication with the outflow ports 13a, 13b, the rotor support shaft 18 and the valve element support shaft 35 are inserted from the front face side into the shaft holes 13d, 13e respectively. After that, the respective above-mentioned portions are brazed from the rear face side simultaneously when the valve seat plate 13 is brazed by using a hydrogen reducing furnace. As a result, the inflow pipe 28c, the outflow pipes 28a, 28b, the rotor support shaft 18 and the valve element support shaft 35 are fixed on the rear face side of the valve seat plate 13.

As described above, the valve seat plate 13 in an embodiment of the present invention is constructed so as to be divided into the first plate member 11 and the second plate member 12 in an intra-surface direction. Further, the second plate member 12 is constructed of a pressed product and the first plate member 11 is constructed of a cutting-work product which is thicker than the second plate member 12. Therefore, although the area of the surface of the valve seat plate 13 where the outflow ports 13a, 13b are formed is a sliding face for the valve element 30, the first plate member 11 made of a cutting-work product is used for this portion and thus a high degree of its surface accuracy can be obtained. In addition, since the first plate member 11 is formed in a thick shape, even when the outflow pipes 28b, 28c are press-fitted and then fixed by brazing, distortion does not occur in the sliding face for the valve element 30 due to stress or thermal stress.

In the valve seat plate 13 in accordance with an embodiment of the present invention, the first plate member 11 made of a cutting-work product is used for a portion which is required to be a high degree of surface accuracy or a low degree of distortion, and thus a high degree of quality of the valve seat plate 13 can be attained. Further, the above-mentioned required portion is constructed of the first plate member 11 that is made of a cutting-work product and thus the area required to finish with a high degree of accuracy becomes small and polishing operation is efficiently performed. In addition, the dimension of the outer diameter of the first plate member 11 which is made of a cutting-work product is small and thus a cutting time becomes short. Consequently, increase of a manufacturing cost can be restrained.

On the other hand, the second plate member 12 is formed of an inexpensive pressed product and thus a high degree of surface accuracy may not be attained. Further, the thickness of the second plate member 12 is thin, for example, 1.6 mm and thus distortion may occur due to heat, for example, at the time of brazing. Especially, in the event of that the third plate member 17 is not provided, when internal-pressure in a sealed space formed by the sealing case 19 and the valve seat plate 13 increases, the second plate member 12 may deform to cause a brazed portion between the first plate member 11 and the second plate member 12 to occur a crack and thus airtightness of the sealed space may be impaired. However, in accordance with an embodiment of the present invention, since deformation of the second plate member 12 is prevented by the third plate member 17, the crack of jointed portions between the first plate member 11 and the second plate member 12 can be prevented.

Concretely, four supply holes 17c, 17c' formed on the outer peripheral side of the third plate member 17 for supplying brazing material are formed at positions such that two straight lines connecting the two supply holes 17c each other and connecting two supply holes 17c' each other are approximately perpendicular to each other. Further, portions around at least four supply holes 17c, 17c' are surely fixed to the second plate member 12 with brazing material. Therefore, deformations of the second plate member 12 in two directions perpendicular to each other in an intra-surface direction are prevented in a good balance, and thus the occurrence of a crack at the brazed portions between the second plate member 12 and the third plate member 17 can be prevented.

As described above, in accordance with an embodiment of the present invention, since a thick cutting-work product is used only in a portion where it is required, pipes can be attached without occurring distortion on a portion where the valve element 30 slides. Further, even when an inexpensive pressed product is used for the second plate member 12, since deformation of the second plate member 12 is prevented by the third plate member 17, the crack of brazed portions between the first plate member 11 and the second plate member 12 can be prevented. In addition, since above-mentioned brazed portions are not utilized as the sliding face of the valve element 30, even though the second plate member 12 is not finished with a high degree of surface accuracy and distortion occurs due to heat at the time of brazing or the like, quality of the valve seat plate 13 is not lowered and manufacturing cost of the valve seat plate 13 can be reduced.

The present invention has been described in detail using the embodiments, but the present invention is not limited to the embodiments described above and many modifications can be made without departing from the present invention. For example, in accordance with an embodiment of the present invention, four supply holes 17c, 17c' are formed in the third plate member 17. However, the present invention is not limited to the structure and two or more supply holes 17c, 17c' may be formed in the third plate member 17.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A valve drive device comprising:
    a valve seat plate in which an inflow port for fluid and an outflow port for the fluid are formed so as to penetrate through the valve seat plate in its thickness direction;
    a sealing case which covers a front face side of the valve seat plate;
    an inflow pipe which is fixed in a rear face side of the valve seat plate so as to be in communication with the inflow port;
    an outflow pipe which is fixed in the rear face side of the valve seat plate so as to be in communication with the outflow port; and
    a valve element which slides on an area where the outflow port is formed on the front face side of the valve seat plate to open or close the outflow port;
    wherein the valve seat plate comprises:
        a first plate member which constructs an area where the outflow port is formed;
        a second plate member which is thinner than the first plate member and is jointed with the first plate member; and
        a deformation preventing member which is attached on the rear face side of the second plate member and prevents the second plate member from being deformed due to an internal-pressure in a sealed space constructed by the sealing case and the valve seat plate;
    wherein the deformation preventing member is a third plate member made of a planar thin plate which is formed in a size to cover an approximately entire face of the second plate member and an outer side of the third plate member is fixed on the rear face of the second plate member; and
    wherein the third plate member is provided with four fixing parts which are fixed on the rear face of the second plate member and the fixing parts are disposed such that straight lines connecting two opposite fixing parts to each other are roughly perpendicular to each other.

2. The valve drive device according to claim 1;
    wherein the first plate member is a cutting-work product and the second plate member is a pressed product.

3. The valve drive device according to claim 1;
    wherein the fixing part is constructed by a brazed portion which is formed such that a portion around a through-hole formed in the third plate member is brazed.

4. The valve drive device according to claim 1;
    wherein the first plate member is a cutting-work product and the second plate member is a pressed product; and
    wherein the fixing part is constructed by a brazed portion which is formed such that a portion around a through-hole formed in the third plate member is brazed.

5. A valve drive device comprising:
    a valve seat plate in which an inflow port for fluid and an outflow port for the fluid are formed so as to penetrate through the valve seat plate in its thickness direction;
    a sealing case which covers a front face side of the valve seat plate;
    an inflow pipe which is fixed in a rear face side of the valve seat plate so as to be in communication with the inflow port;
    an outflow pipe which is fixed in the rear face side of the valve seat plate so as to be in communication with the outflow port; and
    a valve element which slides on an area where the outflow port is formed on the front face side of the valve seat plate to open or close the outflow port;
    wherein the valve seat plate comprises:
        a first plate member which constructs an area where the outflow port is formed;
        a second plate member to which the first plate member is jointed and which is fitted to the sealing case to make the inside of the sealing case in a sealed state together with the first plate member;
        a third plate member which is provided on the rear face side of the second plate member and prevents deformation of the second plate member; and
    wherein the third plate member is provided with four fixing parts which are fixed on the rear face of the second plate member and the fixing parts are disposed such that straight lines connecting two opposite fixing parts to each other are roughly perpendicular to each other.

6. The valve drive device according to claim 5, wherein the first plate member is mounted to a through hole formed in the second plate member and the third plate member is positioned by the second plate member and is fixed by brazing on the rear face of the second plate member.

7. The valve drive device according to claim 6, further comprising:
   a rotor support shaft which rotatably supports a pinion member that is rotated by a motor, the rotor support shaft being fixed in the second plate member by brazing; and
   a valve element support shaft, which rotatably supports a gear that is rotated by the pinion member and is formed with the valve element for opening or closing the outflow port in an integral manner, is fixed in the first plate member by brazing.

8. The valve drive device according to claim 7; wherein the third plate member is provided with a fixing part which is fixed on the rear face of the second plate member, and the fixing part is constructed by a brazed portion which is formed such that a portion of the second plate member around a through-hole formed in the third plate member is brazed with the third plate member.

9. A valve seat plate in a valve drive device comprising:
   a first plate member which constructs an area where an outflow port is formed;
   a second plate member which is thinner than the first plate member and is jointed with the first plate member; and
   a deformation preventing member which is attached on a rear face side of the second plate member and prevents the second plate member from being deformed due to an internal-pressure in a sealed space constructed by a sealing case and the valve seat plate;
   wherein the deformation preventing member is provided with four fixing parts which are fixed on the rear face of the second plate member and the fixing parts are disposed such that straight lines connecting two opposite fixing parts to each other are roughly perpendicular to each other.

* * * * *